Nov. 9, 1965    G. D. DAY    3,216,772
BELT AND TRACK TENSIONER
Filed Aug. 15, 1962    2 Sheets-Sheet 1

Inventor
George D. Day
By Stevens, Davis, Miller & Mosher
Attorneys

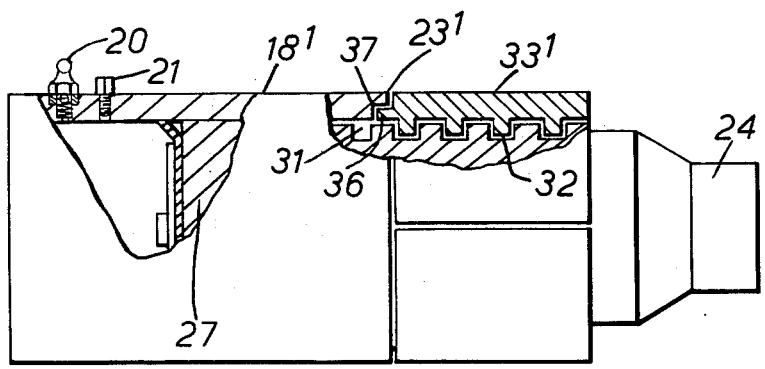
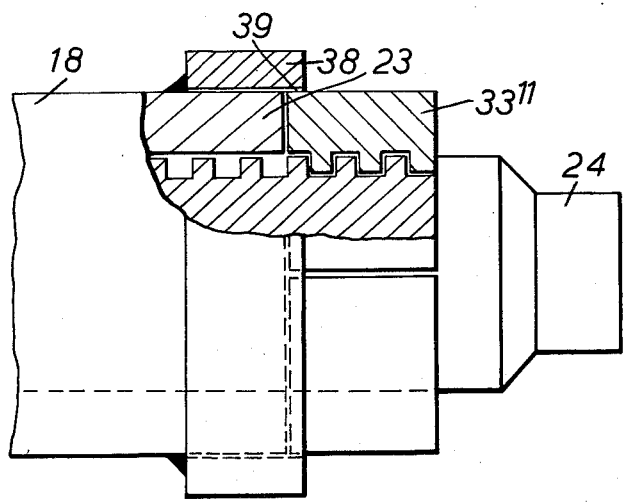

United States Patent Office
3,216,772
Patented Nov. 9, 1965

3,216,772
BELT AND TRACK TENSIONER
George D. Day, London, Ontario, Canada, assignor of one-third to Melvin A. McIntyre and one-third to Alick Wanechko
Filed Aug. 15, 1962, Ser. No. 217,170
Claims priority, application Canada, June 14, 1962, 851,502, Patent 675,900
4 Claims. (Cl. 305—10)

This invention relates to new and useful improvements in hydraulic tensioners for endless tracks or belts and more particularly to hydraulic track tensioners for use on vehicles having endless tracks.

It is presently the practice to provide an hydraulic track tensioner including an hydraulic cylinder having a piston slidable therein and a grease fitting adjacent the closed end of the cylinder through which grease is admitted to the cylinder to move the cylinder outwardly. The grease in the cylinder also serves to retain the piston in the outwardly adjusted position. This outward movement of the piston is directed against a movable idler wheel thereby adjusting the tension of the track.

A disadvantage of this track tensioning means is that constant inward pressure against the piston, encountered during operation of the vehicle, causes the grease to leak out of the cylinder. This leakage is usually due to failure of the sealing means provided between the piston and the cylinder wall and results in loss of tension in the vehicle tracks.

It has been proposed to prevent inward movement of the piston by providing a locking means which engages the piston and the hydraulic cylinder.

The present invention provides an hydraulic tensioner for use on an endless track or belt having at least one belt engaging wheel movably mounted on a frame member, said tensioner comprising an hydraulic assembly including a cylinder, a piston in said cylinder; means communicating with said cylinder whereby fluid is introduced into and retained in said cylinder to move said piston outwardly, said hydraulic tensioner being adapted on outward movement of said piston to cause movement of said movable wheel to increase tension on said belt, and locking means engaging the end of said cylinder and said piston to prevent inward movement of said piston, said locking means including a split ring provided with annular internal ridges adapted to co-operate with annular peripheral grooves on said piston and means to retain said ridges in engagement with said grooves.

Thus the present invention provides an hydraulic track tensioner, that is readily adapted for use with crawler type vehicles, that is simple and practical in construction, reliable in use, and easily manipulated without the use of special tools.

In the drawing which illustrates embodiments of the invention:

FIGURE 3 is a side elevation, partly in section similar to FIGURE 2 showing a modified type locking means of the present invention and FIGURE 4 is a side elevational view, partly in section, showing a further modification of the locking means of the present invention.

Figure 1:
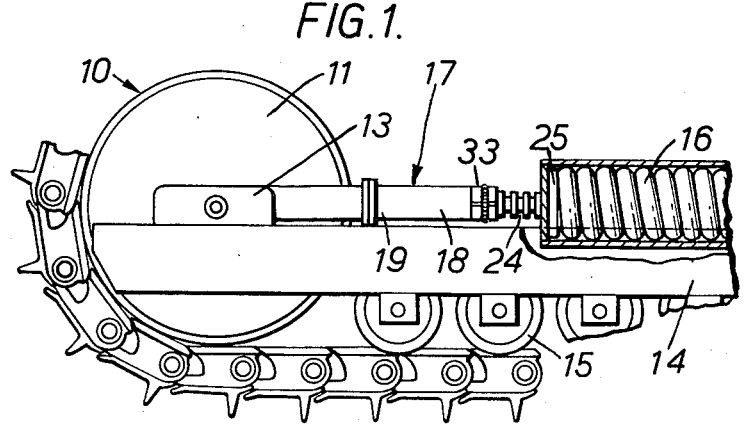
FIGURE 1 is a fragmentary side elevational view of an endless track vehicle showing the hydraulic track tensioner.

In FIGURE 1 a portion of a track assembly of a crawler type vehicle is shown generally at 10, which includes an idler wheel 11 adapted to engage an endless track 12. The idler wheel 11 is rotatably mounted on a guide yoke 13 which is slidably supported by a frame member 14. The track assembly 10 also includes a plurality of track engaging rollers 15 journalled on the frame member 14. A helical compression spring 16 is also provided on the frame member 14 adjacent the drive sprocket (not shown).

An hydraulic cylinder assembly 17 is supported on the frame member 14 and is mounted between the spring 16 and the guide yoke 13. It includes an hydraulic cylinder 18 whose closed end 19 engages the guide yoke 13. The cylinder 18 is also provided with a one-way valve means such as a grease fitting 20 adjacent its closed end 19 (see FIGURES 2 and 3). The fitting 20 communicates with the interior of the cylinder 18 whereby a fluid may be introduced into the cylinder 18. A bleeder screw 21 is threadedly received in a suitable aperture communicating with the interior of the cylinder 18.

The open end 23 of the cylinder 18 is adapted to receive a piston 24 the outer end of which engages a block 25 on the adjacent end of the helical compression spring 16. The inner end 27 of the piston 24 is provided with a seal 28 secured to the piston 24 by retainer screw 29 and a seal retainer 30.

Figure 2:
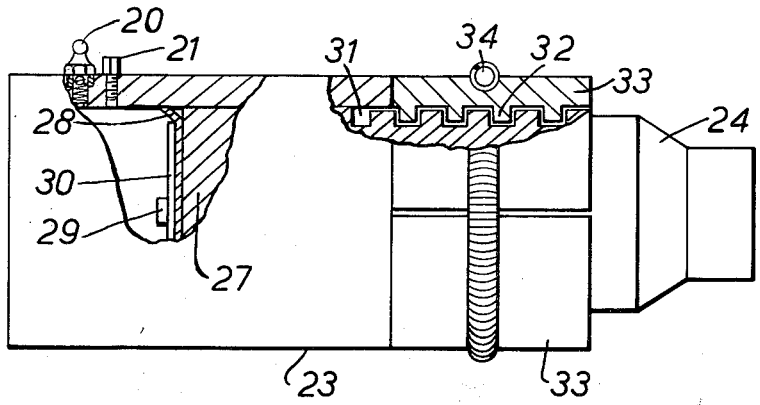
FIGURE 2 is a side elevation, partly in section of the hydraulic assembly and the locking means of the present invention.

A portion of the piston 24 intermediate its ends is provided with a plurality of spaced annular peripheral grooves 31, as shown by FIGURE 2. The grooves 31 are adapted to receive annular internal ridges 32 of a split ring 33. The split ring 33 is selectively positioned on the portion of the piston having the annular peripheral grooves 31 and is retained thereon by an endless helical spring 34 receivably engaged by peripheral groove 35 in the split ring 33.

In FIGURE 3 an alternative construction of an hydraulic cylinder 18' and a split ring 33' is shown wherein the open end 23' of the cylinder 18' is provided with an annular internal recess 37 to receive an annular laterally extending projection 36 on an end of the modified split ring 33'. Although it is not shown, another lateral projection may be provided at the other end of the sprit ring 33' so that the split ring may be reversed.

In FIGURE 4 a further alternative construction of the hydraulic cylinder 18 includes a ring 38 which is welded or otherwise secured to the open end 23 of the cylinder 18. The internal diameter of the ring 38 is substantially the same as the external diameter of the cylinder 18. One end of the ring 38 extends beyond the open end 23 of the cylinder thereby forming a recess 39 receivably to engage an end of a split ring 33''.

While there is no helical retaining spring shown in the embodiment of FIGURE 4, it is also possible to use such helical retaining spring. In this case the spring would act merely to hold the two halves of the split ring 33'' together while the piston is being moved outwardly and the split ring 33'' is out of engagement with the recess 39.

For operation, where it is necessary to increase the tension of the track 12, a fluid is introduced into the hydraulic cylinder 18 through the nipple 20. A convenient method for introducing fluid into the cylinder is that of using a grease gun ordinarily used to lubricate other parts of the vehicle to inject grease into the cylinder 18. It will be noted that it is not necessary to remove the split ring 33 before moving the piston 24 outwardly. Outward movement of the piston 24 causes pressure to be exerted by the piston against the block 25 and pressure is also exerted in the opposite direction by the cylinder 18 against guide 13 and its associated idler wheel 11 causing movement of the idler wheel 11 to take up any slack in the track 12. When the desired amount of tension has been placed in the track 12, the split ring 33 is moved to the position closest to the open end 23 of the cylinder 18 in which the annular internal ridges of the split ring 33 are received by the peripheral grooves 31 of the piston 24. The helical spring 34 is then positioned on the split ring 33 in the periphreal groove 35. After the split ring 33 has been so positioned, the bleed screw 21 is manipulated to release fluid from the cylinder 18. The amount of grease or other fluid so released is sufficient to allow the piston 24 to move inwardly until the adjacent edge of the split ring 33 engages the open end of the cylinder 23. Further inward movement of the piston 24 is prevented by the split ring 33 rather than the grease or other fluid in the cylinder 18. It will be apparent that as extreme lateral forces tending to move the piston 24 inwardly are absorbed by the split ring 33, the useful life of the hydraulic assembly 17 including seal 28 will be greatly extended.

It is often desirable to loosen the track for operation on some types of terrain, such as sand. For such an operation where it is necessary to decrease the tension of the track 12, a fluid is introduced into the hydraulic cylinder 18 through the nipple 20. A convenient method for introducing fluid into the cylinder is that of using a grease gun ordinarily used to lubricate other parts of the vehicle to inject grease into the cylinder 18. It will be noted that it is not necessary to remove the split ring 33 before moving the piston 24 outwardly. Outward movement of the piston 24 causes pressure to be exerted by the piston against the block 25 and pressure is also exerted in the opposite direction by the cylinder 18 against the guide 13 and its associated idler wheel 11 causing movement of the idler wheel 11 to take up any slack in the track 12. The split ring 33 is then moved to a selected position away from the open end 23 of the cylinder 18 in which the annular internal ridges of the split ring 33 are received by the peripheral grooves 31 of the piston 24. The helical spring 34 is then positioned on the split ring 33 in the peripheral groove 35. After the split ring 33 has been so positioned, the bleed screw 21 is manipulated to release fluid from the cylinder 18. The amount of grease or other fluid so released is sufficient to allow the piston 24 to move inwardly until the adjacent edge of the split ring 33 engages the open end of the cylinder 23. Further inward movement of the piston 24 is prevented by the split ring 33 rather than the grease or other fluid in the cylinder 18. Thus the tension on the track is maintained at the desired loosened tension. It will be apparent that as extreme lateral forces tending to move the piston 24 inwardly are absorbed by the split ring 33, the useful life of the hydraulic assembly 17 including seal 28 will be greatly extended.

The operation of the alternative construction of the split ring 33' illustrated in FIGURE 3 for tightening the track tension is quite similar to that of split ring 33 in FIGURE 2 described above. When the piston 24 has been outwardly adjusted to obtain the desired track tension and the split locking ring 33' is positioned in the grooves 31 of the piston 24 so that the end thereof is adjacent the open end of the cylinder 18', grease is released through bleed screw 21 in an amount sufficient to allow piston 24 to move inwardly until the lateral extension 36 on the split ring 33' is fully inserted in the annular recess 37 in the open end 23' of the cylinder 18'. Co-operation of the lateral projection 36 and the recess 37 in this manner serves to retain the ridges 32 of the split ring 33' in the grooves 31 of the piston 24.

It will be apparent that the operation of the alternative construction of the split ring 33" shown in FIGURE 4 for tightening the track tension is identical with the operation of the split ring 33' described above with reference to FIGURE 3. The split ring 33" may also be reversed in order to obtain a finer adjustment of the split ring 33" with respect to the end of the cylinder 23.

It will also be apparent that the embodiments of FIGURES 3 and 4, when used to loosen the track tension operate in the same manner as described in connection with the embodiments of FIGURE 2.

I claim:

1. In combination with an endless track or belt having at least one track engaging wheel movably mounted on a frame member, an hydraulic tensioner comprising: an hydraulic assembly including an open-ended cylinder, a piston in said cylinder, said piston having annular peripheral grooves, means communicating with said cylinder whereby fluid is introduced into and retained in said cylinder to move said piston outwardly, said hydraulic assembly being adapted on outward movement of said piston to cause movement of said movable wheel to increase tension on said track, a split ring provided with annular internal ridges adapted to co-operate with annular peripheral grooves on said piston, said ring engaging the open end of said cylinder to prevent inward movement of said piston, and means to retain said ridges in engagement with said grooves including an internal annular recess formed at the open end of said cylinder, said recess being adapted receivably to engage an adjacent end of said split ring.

2. In combination with an endless track or belt having at least one track engaging wheel movably mounted on a frame member, an hydraulic tensioner comprising: an hydraulic assembly including an open-ended cylinder, a piston in said cylinder, said piston having annular peripheral grooves, means communicating with said cylinder whereby fluid is introduced into and retained in said cylinder to move said piston outwardly, said hydraulic assembly being adapted on outward movement of said piston to cause movement of said movable wheel to increase tension on said track, a split ring provided with annular internal ridges adapted to co-operate with annular peripheral grooves on said piston said ring engaging the open end of said cylinder to prevent inward movement of said piston and means to retain said ridges in engagement with said grooves including, an external annular peripheral ring extending from the open end thereof to form an internal annular recess adapted receivably to engage an adjacent end of said split ring.

3. In combination with an endless track or belt having at least one track engaging wheel movably mounted on a frame member an hydraulic tensioner comprising: an hydraulic assembly including an open-ended cylinder, a piston in said cylinder, said piston having annular peripheral grooves, means communicating with said cylinder whereby fluid is introduced into and retained in said cylinder to move said piston outwardly, said hydraulic assembly being adapted on outward movement of said piston to cause movement of said movable wheel to increase tension on said track, a split ring provided with annular internal ridges adapted to co-operate with annular peripheral grooves on said piston and means to retain said ridges in engagement with said grooves, including an external annular peripheral ring on said cylinder extending from the open end thereof to form an internal annular recess adapted receivably to engage an adjacent end of said split ring, and means to release fluid from said cylinder to allow said piston to move inwardly whereby said adjacent end of said split ring is received in said peripheral ring and said split ring engages the open end of the cylinder to prevent further inward movement of said piston.

4. In combination with an endless track or belt having at least one track-engaging wheel movably mounted on a frame member, an hydraulic tensioner comprising: an hydraulic assembly including on open-ended cylinder, a piston in said cylinder, said piston having ridge-receiving annular peripheral grooves, and means communicating with said cylinder whereby fluid is introduced into and retained in said cylinder to move said piston outwardly, said hydraulic assembly being adapted on outward movement of said piston to cause movement of said movable wheel to increase tension on said track, and locking means engaging the open end of said cylinder and said piston to prevent inward movement of said piston, including a pair of cooperating ring halves provided with annular internal ridges adapted to cooperate with said annular peripheral ridge-receiving grooves on said piston, and means substantially encircling said ring halves for resiliently urging said ridges in engagement with said ridge-receiving grooves.

(References on following page)

References Cited by the Examiner

UNITED STATES PATENTS

| | | | |
|---|---|---|---|
| 2,372,196 | 3/45 | Grime | 92—23 X |
| 2,683,064 | 7/54 | Land | 305—10 |
| 2,828,170 | 3/58 | Badgley | 305—10 X |
| 2,838,343 | 6/58 | Jenkins et al. | 305—10 |
| 2,843,431 | 7/58 | Beaufort | 305—10 |
| 3,008,772 | 11/61 | Helsel | 305—32 |
| 3,079,187 | 2/63 | Cantor | 287—116 |
| 3,099,509 | 7/63 | Duenke | 287—111 X |

FOREIGN PATENTS

| | | |
|---|---|---|
| 725,197 | 3/55 | Great Britain. |
| 540,599 | 5/59 | Canada. |

BENJAMIN HERSH, *Primary Examiner.*

R. H. BRAUNER, ARTHUR L. LA POINT, *Examiners.*